Jan. 19, 1937.   E. M. ROYER   2,068,472
ANTISKID DEVICE FOR AUTOMOBILES
Filed March 27, 1936

Elam M. Royer
INVENTOR
BY Victor J. Evans & Co.
ATTORNEY

Patented Jan. 19, 1937

2,068,472

UNITED STATES PATENT OFFICE 2,068,472

ANTI-SKID DEVICE FOR AUTOMOBILES

Elam M. Royer, Ephrata, Pa.

Application March 27, 1936, Serial No. 71,212

2 Claims. (Cl. 188—5)

This invention relates to anti-skid devices and has for an object to provide a device of this character which may be mounted upon an automobile and may be easily moved to operative position to press wheels to the road bed adjacent the rear wheels of the vehicle to cut into the ice or so engage wet and greasy roads as to positively prevent the car skidding and overturning under severe conditions of service.

A further object of the invention is to provide a novel non-skid device which will be less liable to become wrenched free from position than ordinary devices of this kind, and to this end comprises arms, each of which consists of a plate of substantially triangular formation, there being bars formed integral with the side edges of the plate and extending above the plate, these bars at the small end of the plate journaling the shaft of the road engaging wheel, and at the large end of the plate being provided with strong hinge lugs. A clamp is secured to the rear axle housing of the automobile and carries a pivot pin which passes through the pivot lugs of the arms. Coil springs are sleeved on the pivot pin between the pivot lugs of the arms and bear with one end upon the clamp and with the other end upon the plate. Both springs are under tension when the plates are in raised or released position and move the plates downwardly and force the wheels to penetrate the ice or to firmly engage a greasy or wet road bed to prevent skidding of the vehicle.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1:
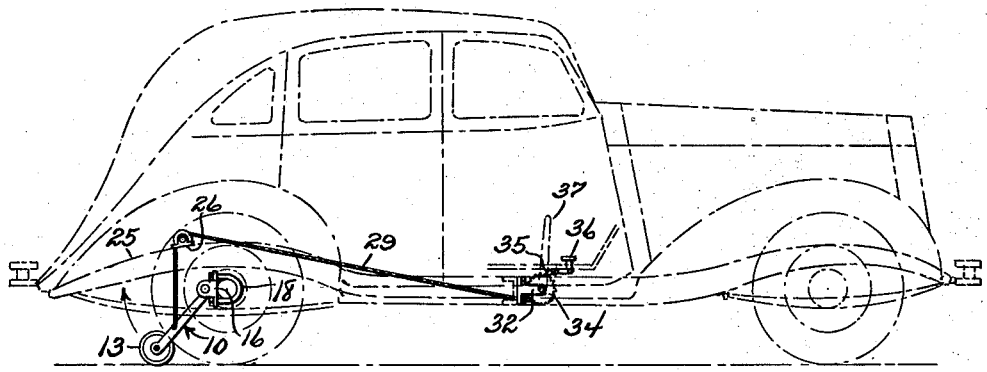
Figure 1 is a side elevation of the anti-skid device applied to an automobile, the latter being shown in dotted lines.
Figure 2:
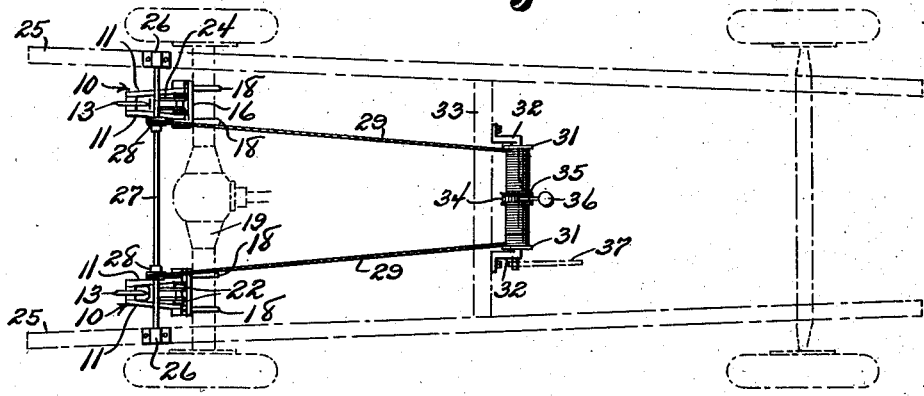
Figure 2 is a plan view of the anti-skid device shown in Figure 1.
Figure 3:
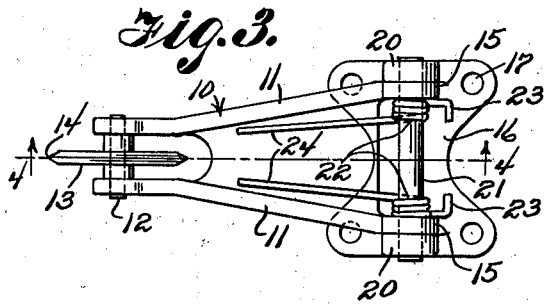
Figure 3 is a plan view of the plate, wheel, clamp and spring forming one of the anti-skid devices.
Figure 4:
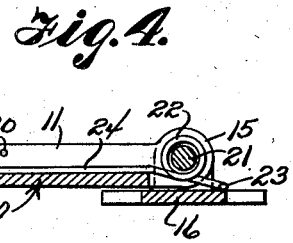
Figure 4 is a longitudinal sectional view taken on the line 4—4 of Figure 3.

Referring now to the drawing in which like characters of reference designate similar parts in the various views, the anti-skid device is shown to comprise a pair of plates 10, each of which, as best shown in Figure 3, is of substantially triangular formation and is provided with arms 11 formed integral with the side edges of the plate and extending above the plate. The arms extend beyond the small end of the plate and the ends thereof are provided with bearing openings in which are journaled the ends of an axle 12 of a disc wheel 13 having a sharpened periphery 14. The arms 11 extend beyond the large end of the plate and these extended ends are provided with pivot lugs 15.

A clamp 16 in the nature of a flat plate is provided with eyes 17 through which U-bolts 18 are passed to secure the clamp to the rear axle housing 19. The clamp is provided with lugs 20 which receive the ends of a pivot pin 21. The pivot pin passes through the pivot lugs 15 of the arms 11 and pivotally mounts the plate 10 and wheel 13 on the bracket to be swung on a horizontal axis and raised to release position or lowered to operative position. A pair of helical springs 22 are sleeved upon the pivot pin 21 and one end 23 of each spring bears against the clamp while the other end 24 extends along the plate 10. The springs are under tension when the arms 11 are raised to release position and when the arms are released the springs move the arms downwardly and force the disc to penetrate the ice or the road bed sufficiently to prevent skidding of the vehicle.

Mounted on the chassis side rails 25 of the automobile above the rear wheel, are a pair of bearing boxes 26 in which the ends of a shaft 27 are journaled. The shaft is equipped with sheaves 28 over which cables 29 are trained, the rear ends of the cables being secured in openings 30 in the arms 11. The front ends of the cables are wound on respective ends of a drum 31 which is rotatably supported on a bracket 32 secured to one of the cross bars 33 of the chassis.

The drum 31 is equipped with an integral ratchet wheel 34 which is engaged by a pawl 35 to normally hold the cables wound upon the drum and thereby hold the arms 11 raised to released position. A foot button 36 on the floor board of the vehicle is pivotally connected to the pawl to disengage the pawl from the ratchet wheel and permit the cables to be unwound from the drum as the springs 22 rock the arms 11 downward to operative position. A ratchet wrench 37 of any preferred type may be utilized to wind the cables on the drum to raise the antiskid devices to released position when their use is not required.

In operation whenever an emergency arises in which the driver feels the car may skid, the foot button 36 is depressed to release the pawl 35 from the ratchet wheel 34 and permit the springs 32 to unwind the cables from the drum and rock the arms 11 downward until the wheels 13 forcibly engage the road bed. Any tendency of the car to skid laterally will be positively prevented by the wheels 13 which penetrate the ice or the road bed sufficiently to prevent lateral movement of the rear of the vehicle while permitting unobstructed forward or rearward movement of the vehicle. When the need for the anti-skid devices has passed, the driver may rewind the cables on the drum to raise the wheels to inoperative position by using the ordinary ratchet wrench 37 applied through a hole in the floor board or applied from the side of the car as desired.

From the above description it is thought that the construction and operation of the invention will be fully understood without further explanation.

What is claimed is:

1. Anti-skid devices comprising clamps, U-bolts adapted to attach the clamps to the rear axle housing of the vehicle, plates having arms pivotally connected to the clamps at the upper ends, road-engaging disc wheels on the lower ends of the arms, springs bearing against the clamps and the plates for normally holding the plates rocked downwardly to engage the wheels with the road bed, cables attached to the plate, a drum for winding up the cables to raise the wheels above the road bed, a ratchet and pawl device assembled with the drum for releasing the drum to permit the springs unwinding the cables therefrom, and a foot operated button connected with the pawl for releasing the pawl.

2. Anti-skid devices comprising a pair of members swingable in an arc from the rear axle housing of the vehicle to engage and disengage from the road bed and each including a plate of substantially triangular formation, there being arms formed integral with the side edges of the plate and extending above the plate, said arms projecting beyond the small end of the plate, an axle journaled in the projecting ends of the arms, a disc road-engaging wheel fixed to said axle and having a sharpened periphery, the arms extending beyond the large end of the plate and being terminally provided with pivot lugs, a clamp adapted to be secured to the rear axle housing of the automobile and having a pivot pin passing through the pivot lugs, and coil springs sleeved on the pivot pin between the pivot lugs of the arm, the inner ends of the springs bearing against the clamp and the outer ends thereof being substantially equal in length and extending upon the plate of the arm, the springs being under tension when the arm is in raised position and when the arm is released moving the arm downwardly and forcing the disc into the road bed.

ELAM M. ROYER.